(12) United States Patent
Onishi et al.

(10) Patent No.: US 11,482,378 B2
(45) Date of Patent: Oct. 25, 2022

(54) THREE-TERMINAL MULTILAYER CERAMIC CAPACITOR AND METHOD FOR MANUFACTURING THREE-TERMINAL MULTILAYER CERAMIC CAPACITOR

(71) Applicant: Murata Manufacturing Co., Ltd., Nagaokakyo (JP)

(72) Inventors: Kosuke Onishi, Nagaokakyo (JP); Satoshi Muramatsu, Nagaokakyo (JP); Taisuke Kanzaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 66 days.

(21) Appl. No.: 16/788,430

(22) Filed: Feb. 12, 2020

(65) Prior Publication Data
US 2020/0312560 A1    Oct. 1, 2020

(30) Foreign Application Priority Data

Mar. 28, 2019   (JP) .............................. JP2019-065080

(51) Int. Cl.
*H01G 4/008*   (2006.01)
*H01G 4/012*   (2006.01)
(Continued)

(52) U.S. Cl.
CPC ......... *H01G 4/2325* (2013.01); *H01G 4/0085* (2013.01); *H01G 4/012* (2013.01);
(Continued)

(58) Field of Classification Search
CPC .. B41M 1/10; B41N 1/06; B41N 1/16; H01G 4/0085; H01G 4/012; H01G 4/1227;
(Continued)

(56) References Cited

U.S. PATENT DOCUMENTS

| | | | |
|---|---|---|---|
| 5,883,780 A | 3/1999 | Noji et al. | |
| 2003/0026059 A1* | 2/2003 | Togashi | H01G 4/005 361/303 |

(Continued)

FOREIGN PATENT DOCUMENTS

| | | |
|---|---|---|
| JP | 07-50220 A | 2/1995 |
| JP | 10-22163 A | 1/1998 |

(Continued)

OTHER PUBLICATIONS

Official Communication issued in corresponding Japanese Patent Application No. 2019-065080, dated Oct. 27, 2021.
Office Action in JP2019065080, dated May 18, 2022, 4 pages.

*Primary Examiner* — Timothy J Thompson
*Assistant Examiner* — Guillermo J Egoavil
(74) *Attorney, Agent, or Firm* — Keating & Bennett, LLP (57) ABSTRACT

A three-terminal multilayer ceramic capacitor includes a capacitor including a ceramic layer, first and second internal electrodes, first and second end surface electrodes, and first and second side surface electrodes, and has a lengthwise dimension of about 1300 μm or more and about 1500 μm or less, a widthwise dimension of about 1000 μm or more and about 1200 μm or less, a heightwise dimension of about 570 μm or more and about 680 μm or less, and a capacitance of about 12 μF or more and about 32 μF or less. The first and second end surface electrodes, and the first and second side surface electrodes include a Ni underlying electrode layer and at least one plating electrode layer. The first and second end surface electrodes have a thickness of about 0.73% or more and about 3.00% or less relative to the lengthwise dimension.

8 Claims, 5 Drawing Sheets

(51) Int. Cl.
*H01G 4/12* (2006.01)
*H01G 4/232* (2006.01)
*H01G 4/248* (2006.01)
*H01G 4/30* (2006.01)

(52) U.S. Cl.
CPC .......... *H01G 4/1227* (2013.01); *H01G 4/248* (2013.01); *H01G 4/30* (2013.01)

(58) Field of Classification Search
CPC ...... H01G 4/232; H01G 4/2325; H01G 4/248; H01G 4/30; H01G 4/35; H01G 4/008; H01G 4/12; H05K 3/1275
USPC ......... 361/301.4, 306.3, 321.4, 321.2, 321.5; 174/260
See application file for complete search history.

(56) References Cited

U.S. PATENT DOCUMENTS

| | | | | |
|---|---|---|---|---|
| 2011/0205684 | A1* | 8/2011 | Yamamoto | H01G 4/232 29/25.42 |
| 2012/0250217 | A1* | 10/2012 | Fukunaga | H01G 4/012 361/301.4 |
| 2013/0222971 | A1* | 8/2013 | Nishimura | H01G 4/005 156/89.12 |
| 2014/0043722 | A1* | 2/2014 | Hirata | H01G 4/30 361/301.4 |
| 2015/0279562 | A1 | 10/2015 | Nishisaka et al. | |
| 2017/0334230 | A1* | 11/2017 | Sawada | H01G 4/30 |
| 2018/0108480 | A1* | 4/2018 | Fujii | H01G 4/012 |
| 2018/0108483 | A1* | 4/2018 | Sasabayashi | H01G 4/248 |
| 2018/0139826 | A1* | 5/2018 | Cho | H01G 4/248 |
| 2019/0051460 | A1 | 2/2019 | Kawamura | |
| 2020/0090872 | A1* | 3/2020 | Sasaki | H01G 4/224 |

FOREIGN PATENT DOCUMENTS

| | | | | |
|---|---|---|---|---|
| JP | 2012-119616 | A | | 6/2012 |
| JP | 2013-012688 | A | | 1/2013 |
| JP | 2015-195295 | A | | 11/2015 |
| JP | 2017-168488 | A | | 9/2017 |
| JP | 2017205951 | A | * | 11/2017 ............ B41C 1/18 |
| JP | 2018067562 | A | * | 4/2018 ............ H01G 4/232 |
| JP | 2019036708 | A | | 3/2019 |

\* cited by examiner

FIG.5

THREE-TERMINAL MULTILAYER CERAMIC CAPACITOR AND METHOD FOR MANUFACTURING THREE-TERMINAL MULTILAYER CERAMIC CAPACITOR

CROSS REFERENCE TO RELATED APPLICATIONS

This application claims the benefit of priority to Japanese Patent Application No. 2019-065080 filed on Mar. 28, 2019. The entire contents of this application are hereby incorporated herein by reference.

BACKGROUND OF THE INVENTION

1. Field of the Invention

The present invention relates to a three-terminal multilayer ceramic capacitor, and more particularly, to a three-terminal multilayer ceramic capacitor having characteristics with little variation and also capable of obtaining a large capacitance, and a method for manufacturing such a three-terminal multilayer ceramic capacitor.

2. Description of the Related Art

Three-terminal multilayer ceramic capacitors are widely used for applications such as countermeasures against noise. For example, Japanese Patent Laid-Open No. 2017-168488 discloses a three-terminal multilayer ceramic capacitor.

Japanese Patent Laid-Open No. 2017-168488 discloses a three-terminal multilayer ceramic capacitor including an external electrode composed of a Ni underlying electrode layer mainly composed of Ni, a Cu plating electrode layer formed on an external surface of the Ni underlying electrode layer, a Ni plating electrode layer formed on an external surface of the Cu plating electrode layer, and a Sn plating electrode layer formed on an external surface of the Ni plating electrode layer.

Generally, three-terminal multilayer ceramic capacitors or similar electronic components having an external surface with an external electrode formed thereon have a specification for external dimensions composed of length, width and height defined with the external electrode's thickness added thereto. For this reason, increasing the thickness of the external electrode requires reducing the capacitive element's external dimensions accordingly. And reducing the capacitive element's external dimensions requires reducing the number of internal electrodes to be stacked or reducing the area of the internal electrode. Therefore, there has been a problem in that it is difficult to obtain a large capacitance when the thickness of the external electrode is increased.

On the other hand, excessively reducing the thickness of the external electrode results in unsatisfactory formation of the external electrode, and contact resistance of the internal electrode and the external electrode, and thus ESL (Equivalent Series Inductance) vary. In particular, when the external electrode has an underlying electrode layer having an excessively reduced thickness, a non-formation region is produced in the underlying electrode layer, and contact resistance of the internal electrode and the external electrode, and thus ESL significantly vary.

The thickness of the underlying electrode layer can be adjusted for example by adjusting the specific gravity and viscosity of a conductive paste applied to an external surface of the capacitive element.

SUMMARY OF THE INVENTION

Preferred embodiments of the present invention provide three-terminal multilayer ceramic capacitors, and methods of manufacturing such three-terminal multilayer ceramic capacitors, that overcome the problems described above.

A three-terminal multilayer ceramic capacitor according to a preferred embodiment of the present invention includes a capacitive element including a stack of a plurality of ceramic layers, and a plurality of first internal electrodes and a plurality of second internal electrodes, and including a first major surface and a second major surface opposite to each other in a heightwise direction, a first end surface and a second end surface opposite to each other in a lengthwise direction orthogonal or substantially orthogonal to the heightwise direction, and a first side surface and a second side surface opposite to each other in a widthwise direction orthogonal or substantially orthogonal to the heightwise direction and the lengthwise direction; a first end surface electrode on the first end surface and extending from the first end surface so as to partially cover the first major surface, the second major surface, the first side surface, and the second side surface; a second end surface electrode on the second end surface and extending from the second end surface so as to partially cover the first major surface, the second major surface, the first side surface, and the second side surface; a first side surface electrode on the first side surface and extending from the first side surface so as to partially cover the first major surface and the second major surface; and a second side surface electrode on the second side surface and extending from the second side surface so as to partially cover the first major surface and the second major surface, the first internal electrodes being connected to the first end surface electrode and the second end surface electrode, the second internal electrodes being connected to the first side surface electrode and the second side surface electrode, the three-terminal multilayer ceramic capacitor having a lengthwise dimension of about 1300 μm or more and about 1500 μm or less, a widthwise dimension of about 1000 μm or more and about 1200 μm or less, and a heightwise dimension of about 570 μm or more and about 680 μm or less, and having a capacitance of about 12 μF or more and about 32 μF or less, the first end surface electrode, the second end surface electrode, the first side surface electrode, and the second side surface electrode each including a Ni underlying electrode layer on an external surface of the capacitive element and at least one plating electrode layer on an external surface of the Ni underlying electrode layer, the first end surface electrode on the first end surface and the second end surface electrode on the second end surface each having a thickness of about 0.73% or more and about 3.00% or less relative to the lengthwise dimension.

A method for manufacturing a three-terminal multilayer ceramic capacitor according to a preferred embodiment of the present invention includes preparing a ceramic green sheet; applying a conductive paste on a major surface of the ceramic green sheet to have a desired shape and a desired thickness for forming a first internal electrode or a second internal electrode; depositing a plurality of ceramic green sheets in layers and integrating the sheets together to form a green capacitive element; applying a conductive paste to an external surface of the green capacitive element to have a desired shape and a desired thickness for forming a Ni underlying electrode layer; firing the green capacitive element to produce a capacitive element including a plurality of ceramic layers, and a plurality of first internal electrodes and a plurality of second internal electrodes deposited in layers, and the Ni underlying electrode layer formed on an external surface; and forming at least one plating electrode layer on an external surface of the Ni underlying electrode layer, the conductive paste applied to the external surface of the green capacitive element having a specific gravity of about 1.1 or more and about 4.0 or less and a viscosity of about 10 Pa·S or more and about 100 Pa·S or less.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the drawings. Each preferred embodiment is an example, and the present invention is not limited to the content of the preferred embodiment. Moreover, it is also possible to combine the contents described in different preferred embodiments, and the contents of such combinations are also included in the present invention. Further, the drawings are intended to facilitate understanding of the specification and may be schematically drawn, and the drawn components or their dimensional ratios may not match those described in the specification. In addition, some of components described in the specification may not be shown in a figure or may be drawn differently in number.

Figure 1:
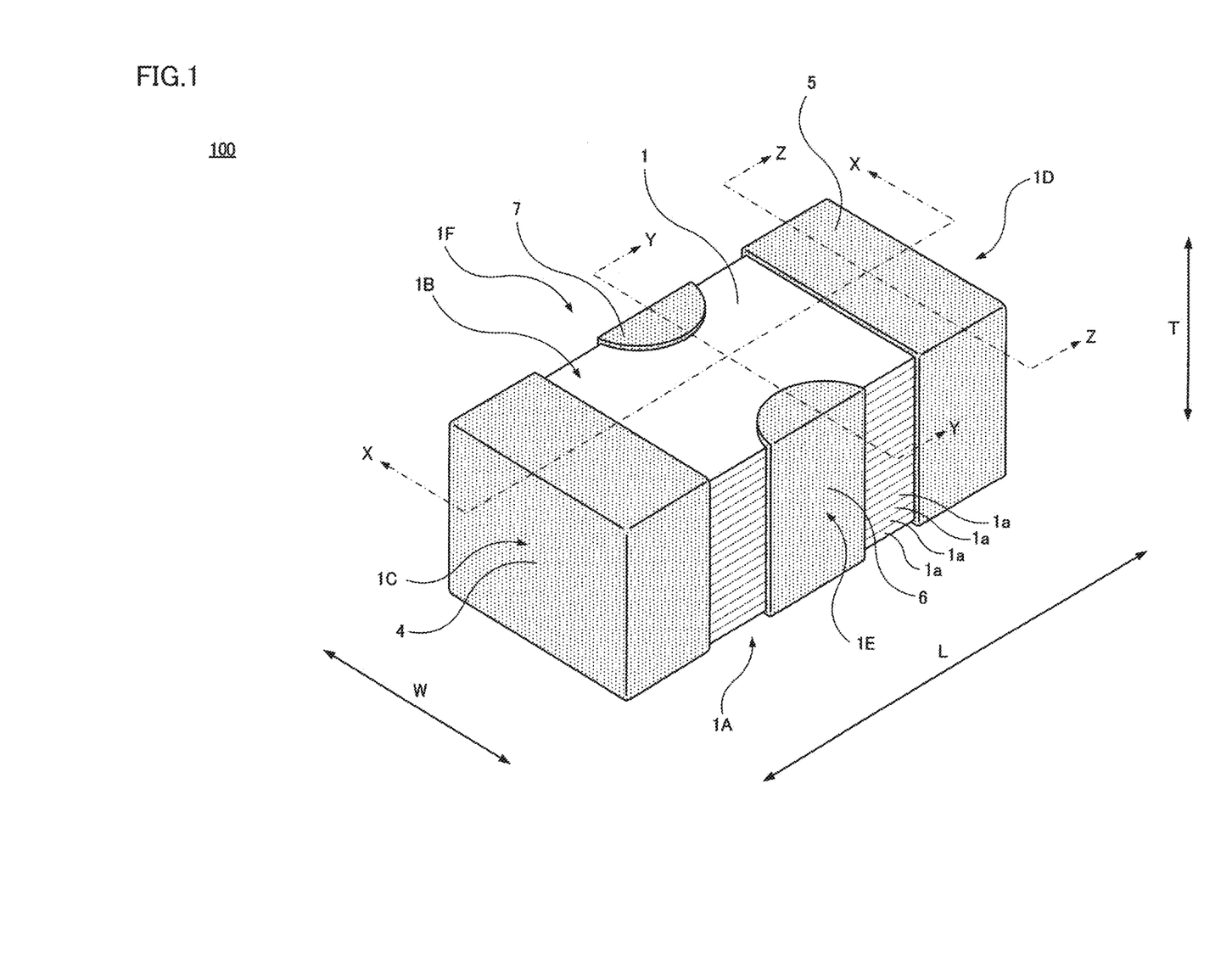
FIG. 1 is a perspective view of a three-terminal multilayer ceramic capacitor 100 according to a preferred embodiment of the present invention.
Figure 2:
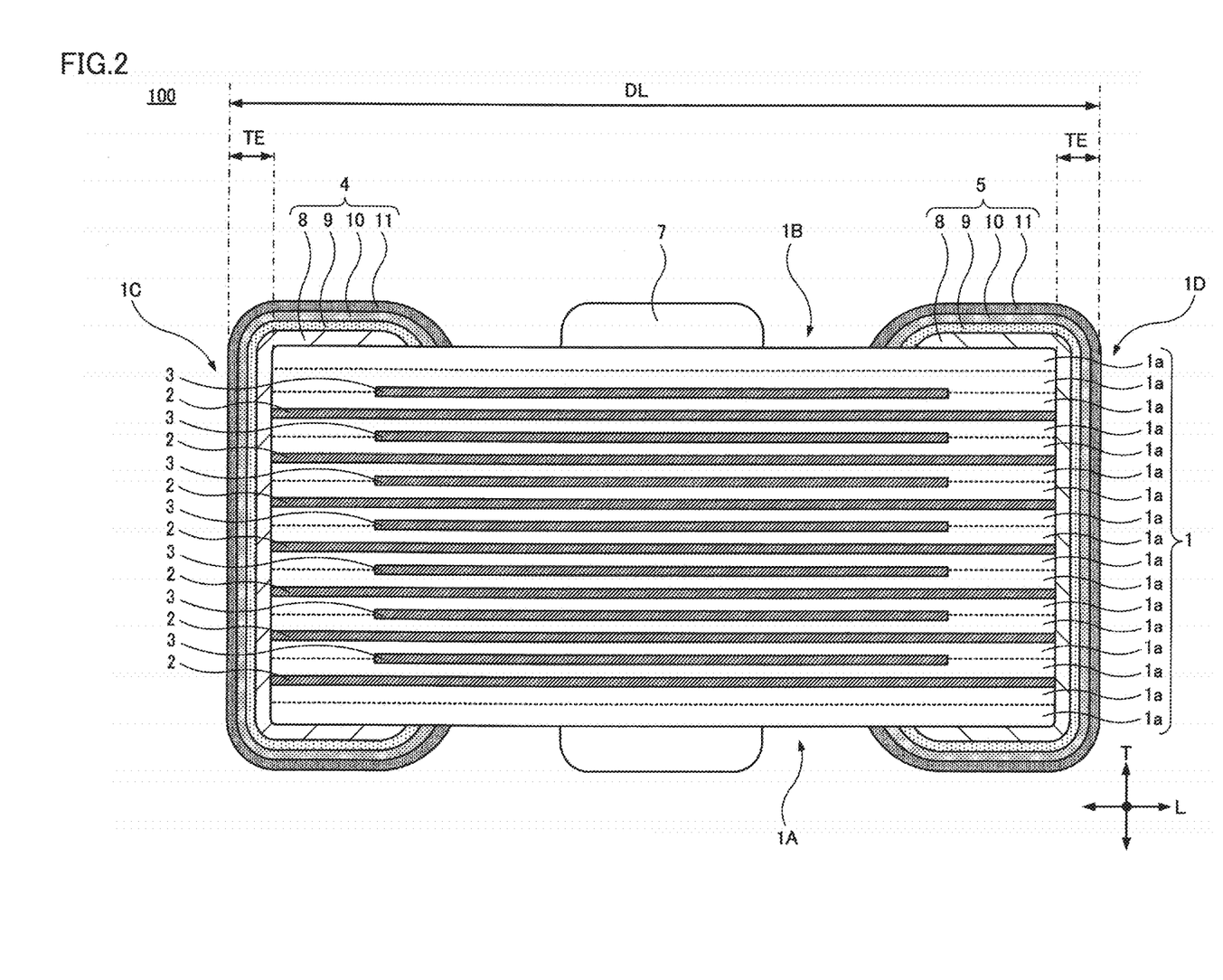
FIG. 2 is a cross section of three-terminal multilayer ceramic capacitor 100, and shows a portion X-X indicated in FIG. 1 by an arrowed, one-dot chain line.
Figure 3:
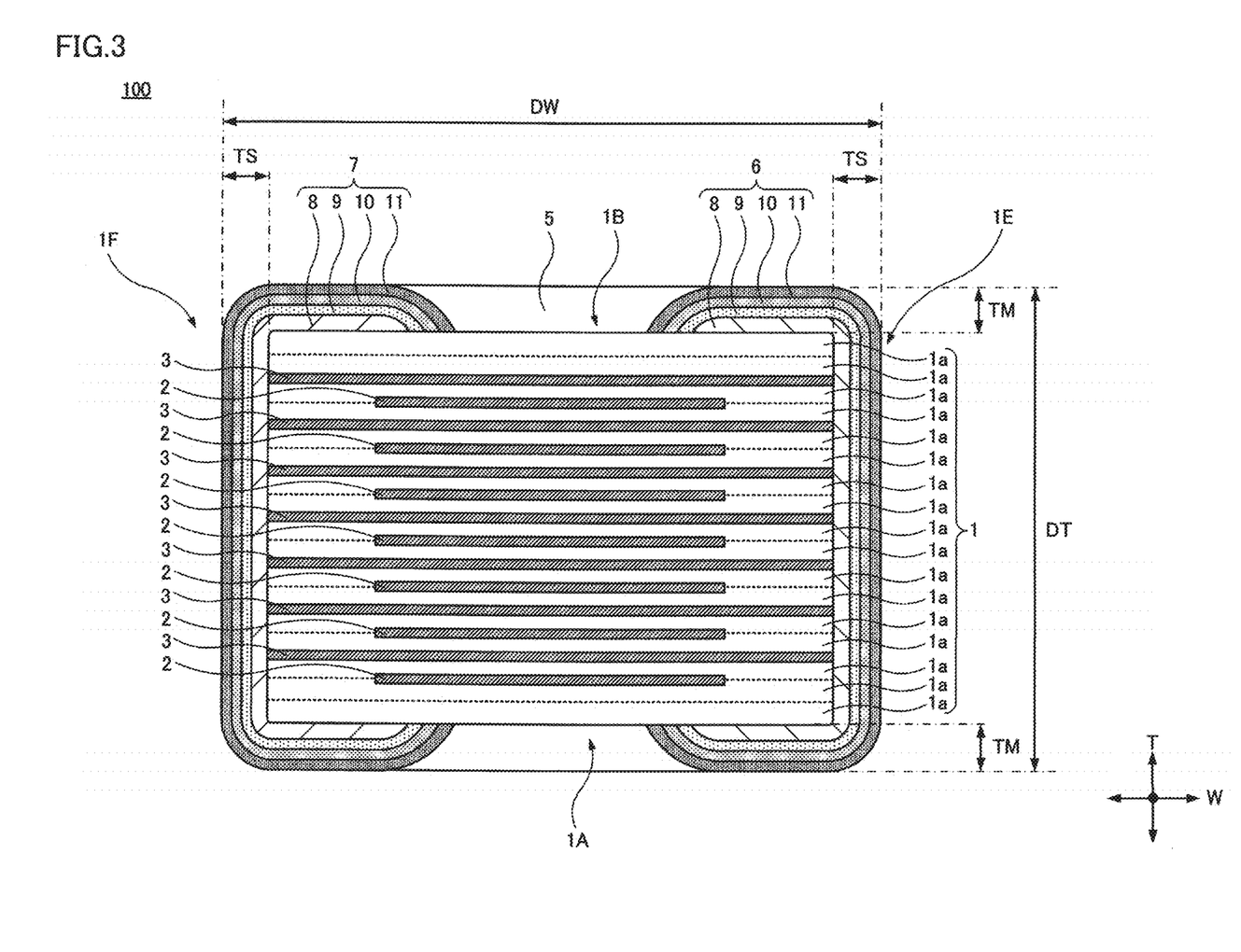
FIG. 3 is a cross section of three-terminal multilayer ceramic capacitor 100, and shows a portion Y-Y indicated in FIG. 1 by an arrowed, one-dot chain line.
Figure 4:
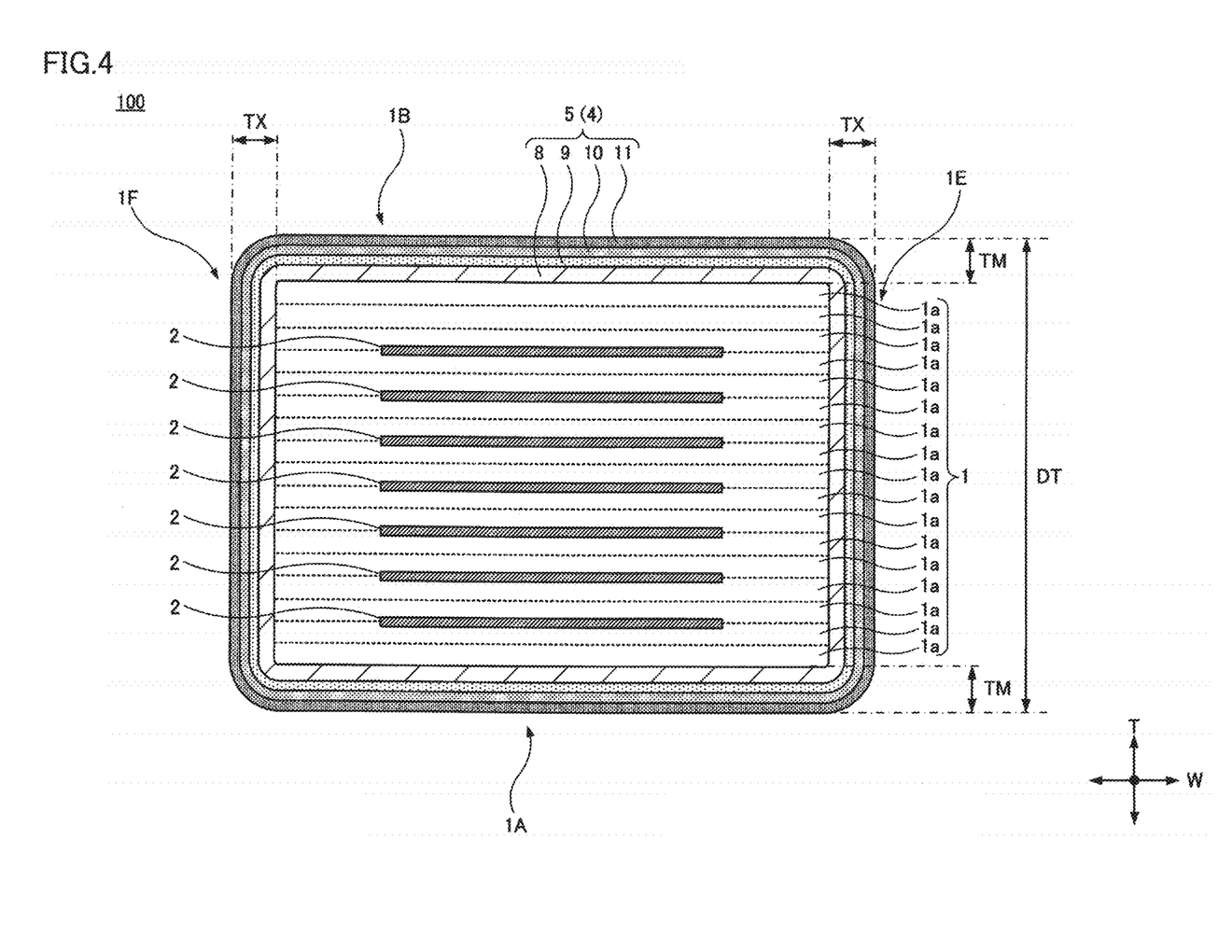
FIG. 4 is a cross section of three-terminal multilayer ceramic capacitor 100, and shows a portion Z-Z indicated in FIG. 1 by an arrowed, one-dot chain line.
Figure 5:
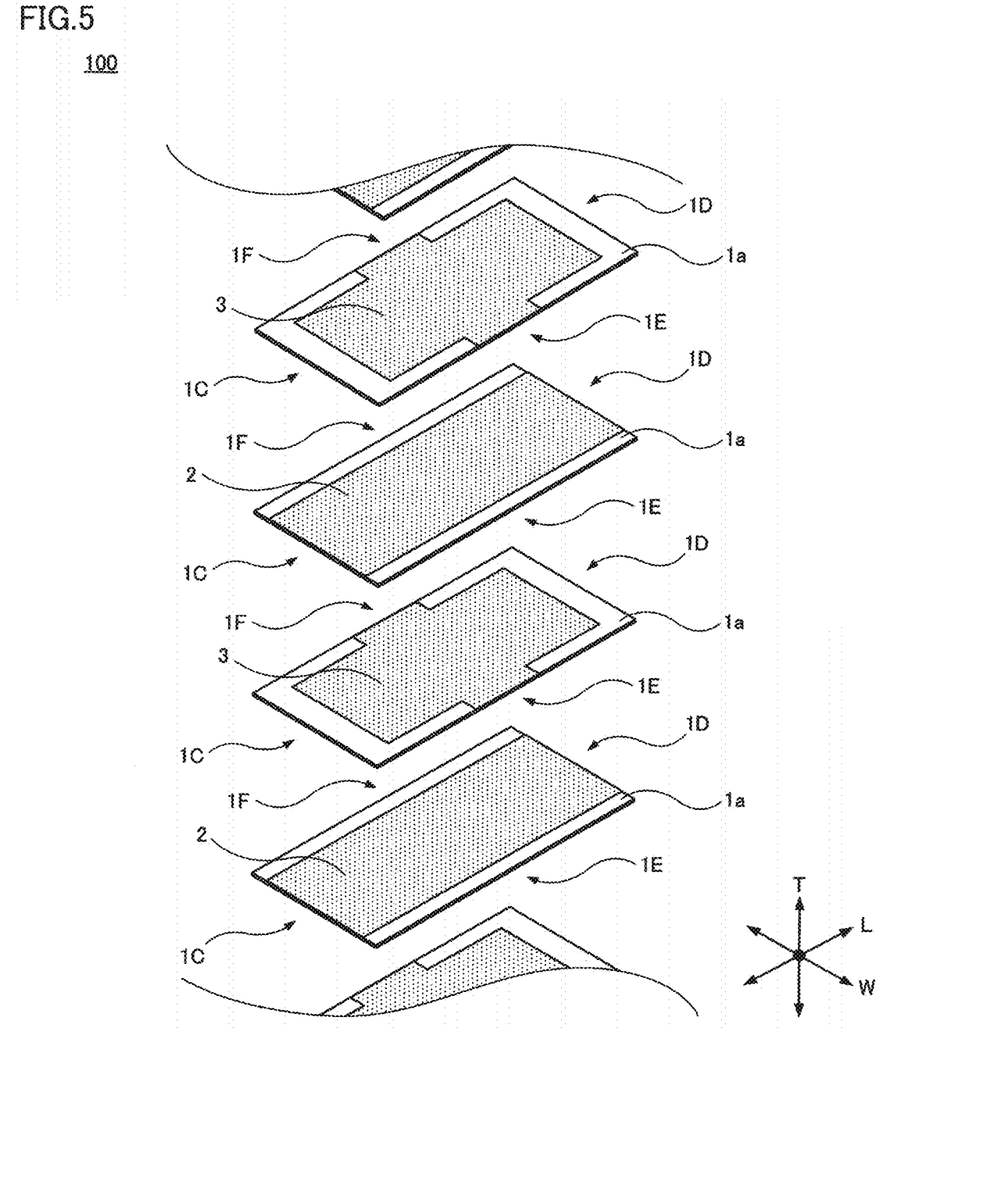
FIG. 5 is an exploded perspective view of three-terminal multilayer ceramic capacitor 100.

FIGS. 1 to 5 show a three-terminal multilayer ceramic capacitor 100 according to a preferred embodiment of the present invention. FIG. 1 is a perspective view of three-terminal multilayer ceramic capacitor 100. FIG. 2 is a cross section of three-terminal multilayer ceramic capacitor 100, and shows a portion X-X indicated in FIG. 1 by an arrowed, one-dot chain line. FIG. 3 is also a cross section of three-terminal multilayer ceramic capacitor 100, and shows a portion Y-Y indicated in FIG. 1 by an arrowed, one-dot chain line. FIG. 4 is also a cross section of three-terminal multilayer ceramic capacitor 100, and shows a portion Z-Z indicated in FIG. 1 by an arrowed, one-dot chain line. FIG. 5 is an exploded perspective view of three-terminal multilayer ceramic capacitor 100. The figures indicate a heightwise direction T, a lengthwise direction L, and a widthwise direction W of three-terminal multilayer ceramic capacitor 100, and these directions may be referred to in the following description. In the present preferred embodiment, a direction in which ceramic layers 1a described hereinafter are stacked is defined as heightwise direction T of three-terminal multilayer ceramic capacitor 100.

Three-terminal multilayer ceramic capacitor 100 includes capacitive element 1 having a rectangular or substantially rectangular parallelepiped shape. Capacitive element 1 includes a first major surface 1A and a second major surface 1B opposite to each other in heightwise direction T, a first end surface 1C and a second end surface 1D opposite to each other in lengthwise direction L orthogonal or substantially orthogonal to heightwise direction T, and a first side surface 1E and a second side surface 1F opposite to each other in widthwise direction W orthogonal or substantially orthogonal to heightwise direction T and lengthwise direction L.

Three-terminal multilayer ceramic capacitor 100 includes the following external dimensions. A dimension DL in lengthwise direction L is about 1300 μm or more and about 1500 μm or less, for example. A dimension DW in widthwise direction W is about 1000 μm or more and about 1200 μm or less, for example. A dimension DT in heightwise direction T is about 570 μm or more and about 680 μm or less, for example. Note that each dimension is a value including a thickness of an external electrode (a first end surface electrode 4, a second end surface electrode 5, a first side surface electrode 6, and a second side surface electrode 7) described hereinafter.

Capacitive element 1 includes a plurality of ceramic layers 1a, and a plurality of first internal electrodes 2 and a plurality of second internal electrodes 3 disposed in layers.

While capacitive element 1 (ceramic layer 1a) may be made of any material, it can, for example, preferably be a dielectric ceramic material mainly including $BaTiO_3$. $BaTiO_3$ may be replaced with a dielectric ceramic material mainly including another material, such as $CaTiO_3$, $SrTiO_3$, and $CaZrO_3$.

While ceramic layer 1a may have any thickness, it can, for example, preferably be about 0.3 μm to about 2.0 μm in an effective capacitance formation region in which first and second internal electrodes 2 and 3 are formed.

While ceramic layer 1a may be any number of layers, it can, for example, preferably be 1 to 6,000 layers in the effective capacitance formation region in which first and second internal electrodes 2 and 3 are provided.

On the upper and lower sides of capacitive element 1, an external layer (a protective layer) not including first and second internal electrodes 2 and 3 and including only ceramic layer 1a is provided. While the external layer may have any thickness, it can, for example, preferably be about 15 μm to about 150 μm. Ceramic layer 1a in the region of the external layer may have a larger thickness than ceramic layer 1a in the effective capacitance formation region in which first and second internal electrodes 2 and 3 are provided, although FIGS. 1 to 4 show the external layer's region and the effective region with ceramic layers 1a having equal or substantially equal thicknesses. Further, ceramic layer 1a in the external layer's region may made of a different material from ceramic layer 1a in the effective region.

The exploded perspective view of FIG. 5 is an exploded view of a vicinity of the center of capacitive element 1 in heightwise direction T for each ceramic layer 1a. As can be seen from FIG. 5, first internal electrode 2 extends in lengthwise direction L of three-terminal multilayer ceramic capacitor 100 and extends to first and second end surfaces 1C and 1D of capacitive element 1. Second internal electrode 3 extends in lengthwise direction L of three-terminal multilayer ceramic capacitor 100 and extends to first and second side surfaces 1E and 1F of capacitive element 1. In principle, first and second internal electrodes 2 and 3 are alternately stacked.

While first and second internal electrodes 2 and 3 may include any major component, it is preferably Ni in the present preferred embodiment. Ni may be replaced with other metals such as Cu, Ag, Pd, and Au, for example. Ni, Cu, Ag, Pd, Au, and the like may be alloyed with other metals.

While first and second internal electrodes 2 and 3 may have any thickness, it can, for example, preferably be about 0.3 μm to about 1.5 μm, for example.

While a gap between first internal electrode 2 and first and second side surfaces 1E and 1F of capacitive element 1 may have any dimension, it can, for example, preferably be about 10 μm to about 200 μm. Further, while a gap between second internal electrode 3 and first and second end surfaces 1C and 1D of capacitive element 1 may have any dimension, it can, for example, preferably be about 0.5 μm to about 300 μm.

On an external surface of capacitive element 1, a first end surface electrode 4, a second end surface electrode 5, a first side surface electrode 6, and a second side surface electrode 7 are provided as an external electrode.

First end surface electrode 4 is provided on first end surface 1C and extends from first end surface 1C so as to partially cover first major surface 1A, second major surface 1B, first side surface 1E, and second side surface 1F.

Second end surface electrode 5 is provided on second end surface 1D and extends from second end surface 1D so as to partially cover first major surface 1A, second major surface 1B, first side surface 1E, and second side surface 1F.

First side surface electrode 6 is provided on first side surface 1E and extends from first side surface 1E so as to partially cover first major surface 1A and second major surface 1B.

Second side surface electrode 7 is provided on second side surface 1F and extends from second side surface 1F so as to partially cover first major surface 1A and second major surface 1B.

First internal electrode 2 extending to first end surface 1C of capacitive element 1 is connected to first end surface electrode 4. First internal electrode 2 extending to second end surface 1D of capacitive element 1 is connected to second end surface electrode 5. Second internal electrode 3 extending to first side surface 1E of capacitive element 1 is connected to first side surface electrode 6. Second internal electrode 3 extending to second side surface 1F of capacitive element 1 is connected to second side surface electrode 7.

Three-terminal multilayer ceramic capacitor 100 can be used as a three-terminal capacitor for example by dividing a power line or a signal line in a circuit, and connecting first and second end surface electrodes 4 and 5 to one and the other portions, respectively, of the divided line and grounding first and second side surface electrodes 6 and 7. In that case, first internal electrode 2 will define and function as a through electrode and second internal electrode 3 will define and function as a ground electrode.

First end surface electrode 4, second end surface electrode 5, first side surface electrode 6, and second side surface electrode 7 all preferably have the same or substantially the same multilayer structure. Specifically, as shown in FIGS. 2 to 4, first end surface electrode 4, second end surface electrode 5, first side surface electrode 6, and second side surface electrode 7 each include a Ni underlying electrode layer 8 on an external surface of capacitive element 1, a Cu plating electrode layer 9 on an external surface of Ni underlying electrode layer 8, a Ni plating electrode layer 10 on an external surface of Cu plating electrode layer 9, and a Sn plating electrode layer 11 on an external surface of Ni plating electrode layer 10.

Ni underlying electrode layer 8 is a portion defining and functioning as a base for first end surface electrode 4, second end surface electrode 5, first side surface electrode 6, and second side surface electrode 7. Cu plating electrode layer 9 mainly improves moisture resistance. Ni plating electrode layer 10 improves soldering heat resistance and also improves bondability. Sn plating electrode layer 11 mainly improves solderability.

Ni underlying electrode layer 8 is mainly made of Ni. However, it is also preferable that Ni underlying electrode layer 8 include a ceramic material, since it can improve adhesion between capacitive element 1 and Ni underlying electrode layer 8. Furthermore, it is also preferable that Ni underlying electrode layer 8 have a ceramic composition the same or substantially the same as that defining capacitive element 1, since it can further improve adhesion between capacitive element 1 and Ni underlying electrode layer 8.

Three-terminal multilayer ceramic capacitor 100 preferably has lengthwise dimension DL of about 1300 μm or more and about 1500 μm or less, for example, as has been set forth above. FIG. 2 shows a cross section of three-terminal multilayer ceramic capacitor 100 with lengthwise dimension DL indicated.

In three-terminal multilayer ceramic capacitor 100, first end surface electrode 4 on first end surface 1C and second end surface electrode 5 on second end surface 1D both preferably have a thickness TE of about 11 μm or more and about 39 μm or less, for example. When thickness TE is less than about 11 μm, first end surface electrode 4 and second end surface electrode 5 are poorly provided, and contact resistance of first internal electrode 2 and first end surface electrode 4 and contact resistance of first internal electrode 2 and second end surface electrode 5, and thus ESL may vary. When thickness TE exceeds about 39 μm, the thickness is more than necessary, and it is necessary to reduce the lengthwise dimension of capacitive element 1, which may make it difficult to obtain a large capacitance.

When thickness TE is about 11 μm, preferably, first end surface electrode 4 on first end surface 1C and second end surface electrode 5 on second end surface 1D are configured such that Ni underlying electrode layer 8 has a thickness of about 5 μm, Cu plating electrode layer 9 has a thickness of about 3 μm, Ni plating electrode layer 10 has a thickness of about 2 μm, and Sn plating electrode layer 11 has a thickness of about 1 μm, for example. The thicknesses of the layers are set as described above for the following reason. When Ni underlying electrode layer 8 has a thickness less than about 5 μm, first end surface electrode 4 and second end surface electrode 5 may be poorly provided. When Cu plating electrode layer 9 has a thickness less than about 3 μm, Cu plating electrode layer 9 may not be able to provide sufficient moisture resistance. When Ni plating electrode layer 10 has a thickness less than about 2 μm, Ni plating electrode layer 10 may not be able to provide sufficient soldering heat resistance and may not be able to provide sufficient adhesion. When Sn plating electrode layer 11 has a thickness less than about 1 μm, Sn plating electrode layer 11 may not be able to provide sufficient solderability.

When thickness TE is about 39 μm, preferably, first end surface electrode 4 on first end surface 1C and second end surface electrode 5 on second end surface 1D are configured such that Ni underlying electrode layer 8 has a thickness of about 15 μm, Cu plating electrode layer 9 has a thickness of about 9 μm, Ni plating electrode layer 10 has a thickness of about 7 μm, and Sn plating electrode layer 11 has a thickness of about 8 μm, for example.

First end surface electrode 4 on first end surface 1C and second end surface electrode 5 on second end surface 1D each preferably have thickness TE of about 0.73% or more and about 3.00% or less relative to lengthwise dimension DL, for example. The above relationship is shown in table 1.

TABLE 1

| LENGTHWISE DIMENSION DL | (MINIMUM)1300 μm TO (MAXIMUM)1500 μm | |
|---|---|---|
| THICKNESS TE OF END SURFACE | (MINIMUM)11 μm TO (MAXIMUM)39 μm | |
| ELECTRODE ON END SURFACE | (BREAKDOWN FOR MINIMUM) Ni UNDERLYING ELECTRODE LAYER: 5 μm Cu PLATING LAYER: 3 μm Ni PLATING LAYER: 2 μm Sn PLATING LAYER: 1 μm | (BREAKDOWN FOR MAXIMUM) Ni UNDERLYING ELECTRODE LAYER: 15 μm Cu PLATING LAYER: 9 μm Ni PLATING LAYER: 7 μm Sn PLATING LAYER: 8 μm |
| THICKNESS TE OF END SURFACE ELECTRODE ON END SURFACE / LENGTHWISE DIMENSION DL | (MINIMUM)0.73% TO (MAXIMUM)3.00% | |

Three-terminal multilayer ceramic capacitor 100 preferably has widthwise dimension DW of about 1000 μm or more and about 1200 μm or less, for example, as has been set forth above. FIG. 3 shows a cross section of three-terminal multilayer ceramic capacitor 100 with widthwise dimension DW indicated.

In three-terminal multilayer ceramic capacitor 100, first side surface electrode 6 on first side surface 1E and second side surface electrode 7 on second side surface 1F both preferably have a thickness TS of about 11 μm or more and about 39 μm or less, for example. When thickness TS is less than about 11 μm, first side surface electrode 6 and second side surface electrode 7 are poorly provided, and contact resistance of second internal electrode 3 and first side surface electrode 6 and contact resistance of second internal electrode 3 and second side surface electrode 7, and thus ESL may vary. When thickness TS exceeds about 39 μm, the thickness is more than necessary, and it is necessary to reduce the widthwise dimension of capacitive element 1, which may make it difficult to obtain a large capacitance.

When thickness TS is about 11 μm, preferably, first side surface electrode 6 on first side surface 1E and second side surface electrode 7 on second side surface 1F are configured such that Ni underlying electrode layer 8 has a thickness of about 5 μm, Cu plating electrode layer 9 has a thickness of about 3 μm, Ni plating electrode layer 10 has a thickness of about 2 μm, and Sn plating electrode layer 11 has a thickness of about 1 μm, for example. The layers are set to thicknesses as described above for the following reason: When Ni underlying electrode layer 8 has a thickness less than about 5 μm, first side surface electrode 6 and second side surface electrode 7 may be poorly provided. When Cu plating electrode layer 9 has a thickness less than about 3 μm, Cu plating electrode layer 9 may not be able to provide sufficient moisture resistance. When Ni plating electrode layer 10 has a thickness less than about 2 μm, Ni plating electrode layer 10 may not be able to provide sufficient soldering heat resistance and may not be able to provide sufficient adhesion. When Sn plating electrode layer 11 has a thickness less than about 1 μm, Sn plating electrode layer 11 may not be able to provide sufficient solderability.

When thickness TS is about 39 μm, preferably, first side surface electrode 6 on first side surface 1E and second side surface electrode 7 on second side surface 1F are configured such that Ni underlying electrode layer 8 has a thickness of about 15 μm, Cu plating electrode layer 9 has a thickness of about 9 μm, Ni plating electrode layer 10 has a thickness of about 7 μm, and Sn plating electrode layer 11 has a thickness of about 8 μm, for example.

First side surface electrode 6 on first side surface 1E and second side surface electrode 7 on second side surface 1F each preferably have thickness TS of about 0.92% or more and about 3.90% or less relative to widthwise dimension DW, for example. The above relationship is shown in table 2.

TABLE 2

| WIDTHWISE DIMENSION DW | (MINIMUM)1000 μm TO (MAXIMUM)1200 μm | |
|---|---|---|
| THICKNESS TS OF SIDE SURFACE | (MINIMUM)11 μm TO (MAXIMUM)39 μm | |
| ELECTRODE ON SIDE SURFACE | (BREAKDOWN FOR MINIMUM) Ni UNDERLYING ELECTRODE LAYER: 5 μm Cu PLATING LAYER: 3 μm Ni PLATING LAYER: 2 μm Sn PLATING LAYER: 1 μm | (BREAKDOWN FOR MAXIMUM) Ni UNDERLYING ELECTRODE LAYER: 15 μm Cu PLATING LAYER: 9 μm Ni PLATING LAYER: 7 μm Sn PLATING LAYER: 8 μm |
| THICKNESS TS OF SIDE SURFACE ELECTRODE ON SIDE SURFACE / WIDTHWISE DIMENSION DW | (MINIMUM)0.92% TO (MAXIMUM)3.90% | |

Three-terminal multilayer ceramic capacitor 100 preferably has heightwise dimension DT of about 570 μm or more and about 680 μm or less, for example, as has been set forth above. FIGS. 3 and 4 show a cross section of three-terminal multilayer ceramic capacitor 100 with heightwise dimension DT indicated. Although FIG. 4 shows second end surface electrode 5 and does not show first end surface electrode 4, first end surface electrode 4 has the same or substantially the same cross section as second end surface electrode 5.

In three-terminal multilayer ceramic capacitor 100, first end surface electrode 4 on first major surface 1A, first end surface electrode 4 on second major surface 1B, second end surface electrode 5 on first major surface 1A, second end surface electrode 5 on second major surface 1B, first side surface electrode 6 on first major surface 1A, first side surface electrode 6 on second major surface 1B, second side surface electrode 7 on first major surface 1A and second side surface electrode 7 on second major surface 1B all preferably have thickness TM of about 8 μm or more and about 36 μm or less, for example.

side surface electrode 7 on first major surface 1A and second side surface electrode 7 on second major surface 1B all preferably have thickness TM of about 1.18% or more and about 6.32% or less relative to heightwise dimension DT, for example. The above relationship is shown in table 3.

TABLE 3

| HEIGHTWISE DIMENSION DT | (MINIMUM)570 μm TO (MAXIMUM)680 μm |
|---|---|
| THICKNESS TM OF END AND SIDE SURFACE ELECTRODES ON MAJOR SURFACE | (MINIMUM)8 μm TO (MAXIMUM)36 μm (BREAKDOWN FOR MINIMUM) (BREAKDOWN FOR MAXIMUM)<br>Ni UNDERLYING  Ni UNDERLYING<br>ELECTRODE LAYER: 2 μm  ELECTRODE LAYER: 12 μm<br>Cu PLATING LAYER: 3 μm  Cu PLATING LAYER: 9 μm<br>Ni PLATING LAYER: 2 μm  Ni PLATING LAYER: 7 μm<br>Sn PLATING LAYER: 1 μm  Sn PLATING LAYER: 8 μm |
| THICKNESS TM OF END AND SIDE SURFACE ELECTRODES ON MAJOR SURFACE / HEIGHTWISE DIMENSION DT | (MINIMUM)1.18% TO (MAXIMUM)6.32% |

Thickness TM does not have a substantial effect on contact resistance of first internal electrode 2 and first end surface electrode 4, contact resistance of first internal electrode 2 and second end surface electrode 5, contact resistance of second internal electrode 3 and first side surface electrode 6, and contact resistance of second internal electrode 3 and second side surface electrode 7. As such, the minimum value of thickness TM is preferably set to about 8 μm, for example. That is, it is smaller than the minimum value of thickness TE, i.e., about 11 μm, and the minimum value of thickness TS, i.e., about 11 μm.

When thickness TM is about 8 μm, first end surface electrode 4, second end surface electrode 5, first side surface electrode 6 and second side surface electrode 7 on first major surface 1A, and first end surface electrode 4, second end surface electrode 5, first side surface electrode 6 and second side surface electrode 7 on second major surface 1B are preferably configured such that Ni underlying electrode layer 8 has a thickness of about 2 μm, Cu plating electrode layer 9 has a thickness of about 3 μm, Ni plating electrode layer 10 has a thickness of about 2 μm, and Sn plating electrode layer 11 has a thickness of about 1 μm, for example.

When thickness TM is about 36 μm, first end surface electrode 4, second end surface electrode 5, first side surface electrode 6 and second side surface electrode 7 on first major surface 1A, and first end surface electrode 4, second end surface electrode 5, first side surface electrode 6 and second side surface electrode 7 on second major surface 1B are preferably configured such that Ni underlying electrode layer 8 has a thickness of about 12 μm, Cu plating electrode layer 9 has a thickness of about 9 μm, Ni plating electrode layer 10 has a thickness of about 7 μm, and Sn plating electrode layer 11 has a thickness of about 8 μm, for example.

First end surface electrode 4 on first major surface 1A, first end surface electrode 4 on second major surface 1B, second end surface electrode 5 on first major surface 1A, second end surface electrode 5 on second major surface 1B, first side surface electrode 6 on first major surface 1A, first side surface electrode 6 on second major surface 1B, second Note that thickness TX of first end surface electrode 4 and second end surface electrode 5 on first side surface 1E and thickness TX of first end surface electrode 4 and second end surface electrode 5 on second side surface 1F shown in FIG. 4 are preferably equal to or smaller than thickness TS of first side surface electrode 6 on first side surface 1E and thickness TS of second side surface electrode 7 on second side surface 1F shown in FIG. 3. This is because even if thickness TS is reduced, thickness TX exceeding thickness TS may result in three-terminal multilayer ceramic capacitor 100 having widthwise dimension DW exceeding its specification.

Three-terminal multilayer ceramic capacitor 100 including first end surface electrode 4, second end surface electrode 5, first side surface electrode 6, and second side surface electrode 7 dimensioned in thickness as described above can have characteristics (ESL in particular) with little variation and also obtain large capacitance.

Example of a Method for Manufacturing Three-Terminal Multilayer Ceramic Capacitor 100

A non-limiting example of a method for manufacturing three-terminal multilayer ceramic capacitor 100 according to a preferred embodiment of the present invention will be described.

Initially, capacitive element 1 including first and second internal electrodes 2 and 3 formed therein and Ni underlying electrode layer 8 formed on an external surface for first end surface electrode 4, second end surface electrode 5, first side surface electrode 6, and second side surface electrode 7 is prepared.

Specifically, initially, dielectric ceramic powder, binder resin, a solvent, and the like are prepared and wet-mixed together to prepare a ceramic slurry.

Subsequently, the ceramic slurry is applied on a carrier film in the form of a sheet with a die coater, a gravure coater, a micro gravure coater or the like, for example, and dried to produce a ceramic green sheet.

Subsequently, a conductive paste prepared in advance is applied (for example, printed) in a desired pattern on a major surface of a prescribed ceramic green sheet to form first and second internal electrodes 2 and 3. Note that the conductive paste is not applied to a ceramic green sheet which will define and function as an external layer. Note that the conductive paste can for example be a solvent, binder resin, metal powder (for example, Ni powder) and the like, for example, mixed together.

Subsequently, such ceramic green sheets are stacked in a prescribed order and integrated together by thermocompression bonding to produce a green capacitive element.

Subsequently, a conductive paste is applied on an external surface of the green capacitive element to have a desired shape and a desired thickness in order to form Ni underlying electrode layer 8. Note that the conductive paste can for example be a solvent, binder resin, Ni powder, ceramic powder, and the like mixed together.

The thickness of Ni underlying electrode layer 8 depends on the thickness of the conductive paste applied. The thickness of the conductive paste to be applied can be adjusted by adjusting the conductive paste in specific gravity and viscosity. Note that when the conductive paste has a smaller specific gravity, the conductive paste can be applied to have a smaller thickness. Furthermore, when the conductive paste has a smaller viscosity, the conductive paste can be applied to have a smaller thickness.

The conductive paste to be applied preferably has a specific gravity of about 1.1 or more and about 4.0 or less, for example. A specific gravity below about 1.1 makes it difficult to apply the conductive paste. A specific gravity exceeding about 4.0 results in the applied conductive paste having an excessively large thickness.

The conductive paste to be applied preferably has a viscosity of about 10 Pa·S or more and about 100 Pa·S or less, for example. A viscosity below about 10 Pa·S makes it difficult to apply the conductive paste. A viscosity exceeding about 100 Pa·S results in the applied conductive paste having an excessively large thickness.

To form first end surface electrode 4 and second end surface electrode 5, a conductive paste is applied to an end surface of the green capacitive element for example by dipping the end surface of the green capacitive element into the conductive paste introduced into a bath. If the conductive paste applied has an excessively large thickness, it is preferable to again dip the green capacitive element once or more into a bath in which the conductive paste is introduced shallowly and scrape off the conductive paste excessively applied.

To form first side surface electrode 6 and second side surface electrode 7, a conductive paste is applied to a side surface of the green capacitive element for example by transferring the paste to a portion of the side surface with a roller provided with a groove.

Subsequently, the green capacitive element is fired in a prescribed profile to complete capacitive element 1. In doing so, the ceramic green sheet is fired to be ceramic layer 1a, the conductive paste applied to the major surface of the ceramic green sheet is simultaneously fired to be first and second internal electrodes 2 and 3, and the conductive paste applied on the external surface of the green capacitive element is simultaneously fired to be Ni underlying electrode layer 8.

Subsequently, Cu plating electrode layer 9 is formed on an external surface of Ni underlying electrode layer 8 for first end surface electrode 4, second end surface electrode 5, first side surface electrode 6, and second side surface electrode 7.

Subsequently, Ni plating electrode layer 10 is formed on an external surface of Cu plating electrode layer 9 for first end surface electrode 4, second end surface electrode 5, first side surface electrode 6, and second side surface electrode 7. If Ni plating electrode layer 10 is formed with a solder ball used as a medium, a Sn layer may be formed at an interface of Cu plating electrode layer 9 and Ni plating electrode layer 10.

Finally, Sn plating electrode layer 11 is formed on an external surface of Ni plating electrode layer 10 to complete first end surface electrode 4, second end surface electrode 5, first side surface electrode 6 and second side surface electrode 7, and hence three-terminal multilayer ceramic capacitor 100.

Three-terminal multilayer ceramic capacitors 100 according to preferred embodiments of the present invention has been described above. However, the present invention is not limited to the contents described above, and various modifications can be made in accordance with the gist of the invention.

For example, while in the above preferred embodiments, the plating electrode layer includes the three layers of Cu plating electrode layer 9, Ni plating electrode layer 10 and Sn plating electrode layer 11, and each dimension in thickness is indicated, the plating electrode layer may include any number of layers, made of any material and have any dimension in thickness, and the number of layers, the material and the dimension in thickness may be changed as appropriate.

For the three-terminal multilayer ceramic capacitor, it is also preferable that the first side surface electrode on the first side surface and the second side surface electrode on the second side surface each have a thickness of about 0.92% or more and about 3.90% or less, for example relative to the widthwise dimension. In that case, the three-terminal multilayer ceramic capacitor can have characteristics (ESL in particular) with reduced variation and can also obtain a large capacitance.

The first end surface electrode on the first major surface, the first end surface electrode on the second major surface, the second end surface electrode on the first major surface, the second end surface electrode on the second major surface, the first side surface electrode on the first major surface, the first side surface electrode on the second major surface, the second side surface electrode on the first major surface and the second side surface electrode on the second major surface each preferably have a thickness of about 1.18% or more and about 6.32% or less, for example, relative to the heightwise dimension. These portions may be reduced in thickness as it does not have a substantial effect on contact resistance of the internal and external electrodes.

Furthermore, it is also preferable that the first end surface electrode on the first side surface and the second end surface electrode on the first side surface are equal to or smaller than the first side surface electrode on the first side surface in thickness, and the first end surface electrode on the second side surface and the second end surface electrode on the second side surface are equal to or smaller than the second side surface electrode on the second side surface in thickness. This is to prevent the three-terminal multilayer ceramic capacitor from having a widthwise dimension exceeding its specification.

Moreover, it is also preferable that the plating electrode layer includes a Cu plating electrode layer on an external surface of the Ni underlying electrode layer, a Ni plating electrode layer on an external surface of the Cu plating electrode layer, and a Sn plating electrode layer on an external surface of the Ni plating electrode layer. In that case, the plating electrode layer can be configured to have satisfactory moisture resistance, soldering heat resistance, solderability and the like.

In a method for manufacturing a three-terminal multilayer ceramic capacitor according to a preferred embodiment of the present invention, it is also preferable that the plating electrode layer includes a Cu plating electrode layer formed on an external surface of the Ni underlying electrode layer, a Ni plating electrode layer formed on an external surface of the Cu plating electrode layer, and a Sn plating electrode layer formed on an external surface of the Ni plating electrode layer. In that case, the plating electrode layer can be formed to have satisfactory moisture resistance, soldering heat resistance, solderability and the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-terminal multilayer ceramic capacitor comprising:
    a capacitive element including a stack of a plurality of ceramic layers, and a plurality of first internal electrodes and a plurality of second internal electrodes, and including a first major surface and a second major surface opposite to each other in a heightwise direction, a first end surface and a second end surface opposite to each other in a lengthwise direction orthogonal or substantially orthogonal to the heightwise direction, and a first side surface and a second side surface opposite to each other in a widthwise direction orthogonal or substantially orthogonal to the heightwise direction and the lengthwise direction;
    a first end surface electrode on the first end surface and extending from the first end surface so as to partially cover the first major surface, the second major surface, the first side surface, and the second side surface;
    a second end surface electrode on the second end surface and extending from the second end surface so as to partially cover the first major surface, the second major surface, the first side surface, and the second side surface;
    a first side surface electrode on the first side surface and extending from the first side surface so as to partially cover the first major surface and the second major surface; and
    a second side surface electrode on the second side surface and extending from the second side surface so as to partially cover the first major surface and the second major surface; wherein
    the first internal electrodes are connected to the first end surface electrode and the second end surface electrode;
    the second internal electrodes are connected to the first side surface electrode and the second side surface electrode;
    the three-terminal multilayer ceramic capacitor has:
    a lengthwise dimension of about 1300 μm or more and about 1500 μm or less;
    a widthwise dimension of about 1100 μm or more and about 1200 μm or less;
    a heightwise dimension of about 570 μm or more and about 680 μm or less; and
    a capacitance of about 12 μF or more and about 32 μF or less;
    the first end surface electrode, the second end surface electrode, the first side surface electrode, and the second side surface electrode each including a Ni underlying electrode layer on an external surface of the capacitive element and at least one plating electrode layer on an external surface of the Ni underlying electrode layer;
    the first end surface electrode on the first end surface and the second end surface electrode on the second end surface each having a thickness of about 0.73% or more and about 3.00% or less relative to the lengthwise dimension; and
    the first side surface electrode on the first side surface and the second side surface electrode on the second side surface each have a thickness of about 0.92% or more and about 3.90% or less relative to the widthwise dimension.

2. The three-terminal multilayer ceramic capacitor according to claim 1, wherein the first end surface electrode on the first major surface, the first end surface electrode on the second major surface, the second end surface electrode on the first major surface, the second end surface electrode on the second major surface, the first side surface electrode on the first major surface, the first side surface electrode on the second major surface, the second side surface electrode on the first major surface and the second side surface electrode on the second major surface each have a thickness of about 1.18% or more and about 6.32% or less relative to the heightwise dimension.

3. The three-terminal multilayer ceramic capacitor according to claim 1, wherein
    the first end surface electrode on the first side surface and the second end surface electrode on the first side surface have a thickness equal to or smaller than that of the first side surface electrode on the first side surface; and
    the first end surface electrode on the second side surface and the second end surface electrode on the second side surface have a thickness equal to or smaller than that the second side surface electrode on the second side surface.

4. The three-terminal multilayer ceramic capacitor according to claim 1, wherein the plating electrode layer includes a Cu plating electrode layer on an external surface of the Ni underlying electrode layer, a Ni plating electrode layer on an external surface of the Cu plating electrode layer, and a Sn plating electrode layer on an external surface of the Ni plating electrode layer.

5. The three-terminal multilayer ceramic capacitor according to claim 1, wherein the ceramic layers are made of a dielectric ceramic material mainly including $BaTiO_3$.

6. The three-terminal multilayer ceramic capacitor according to claim 1, wherein each of the ceramic layers has a thickness of about 0.3 μm to about 2.0 μm.

7. The three-terminal multilayer ceramic capacitor according to claim 1, wherein the first and second internal electrodes include Ni as a major component.

8. The three-terminal multilayer ceramic capacitor according to claim 1, wherein each of the first and second internal electrodes has a thickness of about 0.3 μm to about 1.5 μm.

* * * * *